A. A. ARNOLD.
OPHTHALMIC MOUNTING.
APPLICATION FILED JAN. 2, 1918.
1,347,140.                                           Patented July 20, 1920.
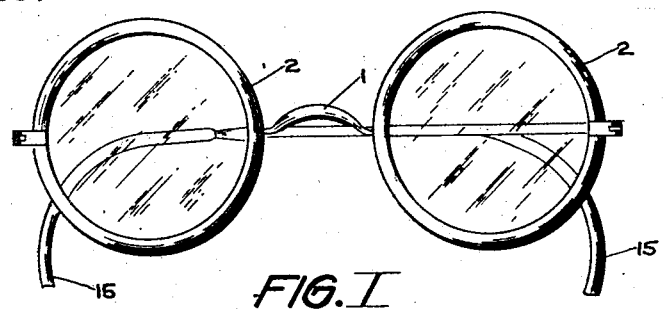
FIG. I
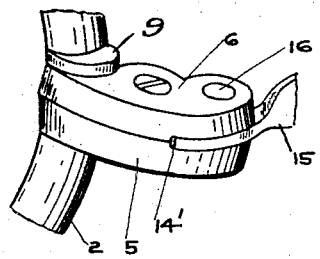
FIG. II
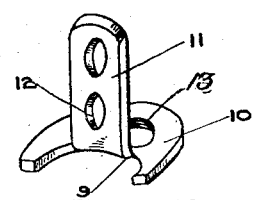
FIG. V
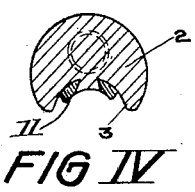
FIG IV
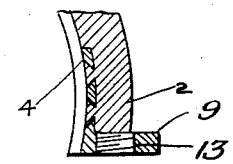
FIG. III
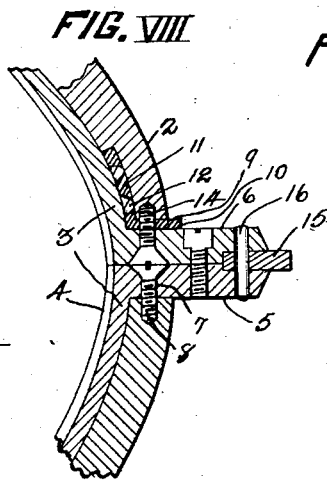
FIG. VI     FIG. VIII
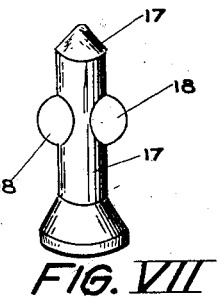
FIG. VII
INVENTOR
ARTHUR A. ARNOLD
BY H. H. Styll & H. K. Parsons
ATTORNEYS

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,347,140.

Specification of Letters Patent.     Patented July 20, 1920.

Application filed January 2, 1918. Serial No. 210,031.

*To all whom it may concern:*

Be it known that I, ARTHUR A. ARNOLD, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings, and more particularly to novel means for connecting several parts of the mounting, the leading object in the present invention being the provision of novel means for connecting the meeting ends of a combination metallic and zyl frame.

Another object of the present invention is the provision of a connecting member portions of which are integrally connected with the xylonite or non-metallic portion of the frame and the remaining portion being detachably connected with the end plates of the frame whereby the metallic end plates can be readily detached from the ends of the frame when desired.

A still further object of the invention is the provision of novel means of attaching the connecting plate to the xylonite whereby portions of the xylonite will be interlocked with the connecting plate to securely hold the plate against the end of the xylonite portion of the frame and in a position whereby the same can be utilized for detachably connecting with the ends of the frame.

With the above and other objects in view the invention consists in the novel features of construction and the combination and arrangement of parts hereinafter more fully set forth, pointed out in the claims and shown in the accompanying drawings, in which—

Figure I is a front elevation of a pair of spectacles constructed in accordance with my invention.

Fig. II is a detailed perspective view of my invention.

Fig. III is a longitudinal sectional view of one end of the frame.

Fig. IV is a transverse sectional view.

Fig. V is a detailed perspective view of the connecting plate.

Fig. VI is a longitudinal sectional view of one end of the frame, illustrating a slightly modified form of the invention, and Fig. VII is a detailed perspective view of one of the connecting pins.

Fig. VIII is an enlarged sectional view through the end pieces and adjacent portions of the frame.

Referring now more particularly to the drawings, the numeral 1 indicates a nose bridge connecting the lens frames 2. These lens frames are formed of a metallic and a non-metallic section, the non-metallic section being preferably of xylonite, celluloid, or a similar material, and includes the outer rim or casing of the frame, the inner face of which is provided with an arcuate groove 3 adapted to receive the metallic rim 4.

The metallic rim 4 is arranged within the groove 3 and the ends of the rims are detachably connected through the medium of the two plates 5 and 6, the plate 5 being provided with an opening 7 and extending therethrough is a threaded pin 8 which is forced into the xylonite of one end of the frame in order to retain the plate 5 in position against the end of the frame. The plate 6 is connected to the opposite end of the frame through the medium of a connecting member generally indicated by the numeral 9. This connecting member includes a substantially arcuate-shaped body portion 10 and extending at right angles from the body portion is a plate 11 provided with spaced openings 12. The body portion of this member 9 is disposed against the end of the frame 2, the plate 11 fitting into the groove 3 of the xylonite rim and in order to connect the plate 11 with the xylonite, the plate is first heated before being engaged with the xylonite so that the heat will tend to soften the xylonite and as pressure is applied to the plate 11, the xylonite will be forced through the openings 12. In order to prevent the xylonite from passing through the openings to the outer surface of the plate 11, a solid surface is arranged against the outer face of the plate so that as the xylonite is forced into the openings 12, it will be prevented from extending beyond the outer face of the plate and thus entirely fill the openings 12 and connect the plate 11 with the xylonite portion of the frame 2.

The body portion of this member 9 is provided with a threaded opening 13 adapted to receive a set screw 14 which is extended through an opening in the inner end of the plate 6 and adapted to connect the plate 6 with the end of the lens frame. It will be noted that the member 9 is of substantially arcuate form and the plate 11 is integrally connected therewith and disposed centrally of the arc so that when the plate is arranged within the groove 3, the ends thereof will be disposed in alinement with the ends of the arc defining the groove within the xylonite rim. From this it will be apparent that the two plates 5 and 6 can be quickly and readily disconnected and the plate 6 easily removed from the end of the lens frame without interfering with the position of the member 9.

The outer ends of the plates 5 and 6 are bifurcated as shown at 14' to receive the inner end of the temple 15 which is pivotally connected between the ends of these plates by means of the pin 16. In Fig. VI I have illustrated a slightly modified form of the invention wherein the screw 8 is replaced by means of a pin 17 having formed thereon the outstanding wings 18 which, when the pin 17 is arranged in position, are adapted to be embedded within the xylonite of the frame, as illustrated in the above mentioned figure, to securely retain the pin within the xylonite and at the same time hold the plate 5 in its respective position. In this form of the invention the pin 17 is extended through the plate 5 and the pin either forced into the cold xylonite or said pin is heated and forced into the xylonite whereby the wings 18 will become thoroughly embedded within the material so that when the same cools it will prevent withdrawal of the pin from the material. It will be apparent that this form of the invention can be used in place of the screw 8. It will be apparent from the foregoing that I have provided a simple and d able device whereby the meeting ends of a lens frame can be quickly and readily connected or disconnected and further provided for novel means whereby the member 9 is readily connected with the xylonite portion of the frame 2.

I claim:

1. An ophthalmic mounting including a metallic frame member, a non-metallic portion, and means for connecting the said parts, including an attaching plate having an upstanding perforated tongue and projections on the non-metallic member interlocking with the perforations on the tongue for connecting the parts.

2. In a device of the character described, the combination with a metallic frame portion and a non-metallic frame portion, of a connecting plate having a projecting tongue formed with countersunk apertures, the non-metallic member having headed projections locked within the countersunk apertures, and means for securing the plate to the metallic portion of the frame.

In testimony whereof I affix my signature in the presence of two witnesses.

ARTHUR A. ARNOLD.

Witnesses:
H. E. COLEMAN,
A. S. CANN.